United States Patent
Braden et al.

(10) Patent No.: US 11,550,530 B2
(45) Date of Patent: Jan. 10, 2023

(54) COMPUTER RESOURCE UTILIZATION REDUCTION DEVICES

(71) Applicant: Hewlett-Packard Development Company, L.P., Spring, TX (US)

(72) Inventors: Daniel James Braden, Spring, TX (US); Robert C. Brooks, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/054,537

(22) PCT Filed: Oct. 2, 2018

(86) PCT No.: PCT/US2018/053868
§ 371 (c)(1),
(2) Date: Nov. 11, 2020

(87) PCT Pub. No.: WO2020/072038
PCT Pub. Date: Apr. 9, 2020

(65) Prior Publication Data
US 2021/0240426 A1    Aug. 5, 2021

(51) Int. Cl.
*G09G 5/00* (2006.01)
*G06F 3/14* (2006.01)
(Continued)

(52) U.S. Cl.
CPC ............ *G06F 3/1415* (2013.01); *G01C 9/06* (2013.01); *G05B 15/02* (2013.01);
(Continued)

(58) Field of Classification Search
CPC .......... G06F 3/0346; G06F 3/0354; G06F 2200/1637; G06F 2200/1614; G06F 3/1415; G06T 7/70; G09G 2340/0492
See application file for complete search history.

(56) References Cited

U.S. PATENT DOCUMENTS

| 7,826,874 B2 | 11/2010 | Fyke |
| 9,076,041 B2 | 7/2015 | Bentley et al. |

(Continued)

FOREIGN PATENT DOCUMENTS

| EP | 2642802 A1 | 9/2013 |
| WO | WO2009018197 A1 | 2/2009 |

OTHER PUBLICATIONS

Davis M., "Build an Automatic Computer Display Rotator With an Arduino", Apr. 12, 2016, Retrieved at https://www.allaboutcircuits.com/projects/build-an-automatic-computer-display-rotator-with-an-arduino/, Retrieved on Apr. 7, 2022, 17 pages.

*Primary Examiner* — Hau H Nguyen
(74) *Attorney, Agent, or Firm* — Quarles & Brady LLP

(57) ABSTRACT

A computing device includes a display device, an accelerometer, and an orientation determination module. The orientation determination module sends a heartbeat of orientation data obtained by the accelerometer to a host device at a first data transfer frequency, and compares a plurality of orientation data most recently received from the accelerometer for at least one axis of orientation to the current orientation data measurement. In response to a difference between the current measurement and any of the plurality of orientation data most recently received from the accelerometer exceeding a threshold, the computing device sends the current orientation data to the host device at a second data transfer frequency, and adjust content displayed on the display device based on the current orientation data received by the host device.

16 Claims, 8 Drawing Sheets

(51) Int. Cl.
  *G01C 9/06* (2006.01)
  *G05B 15/02* (2006.01)
  *G06F 13/42* (2006.01)
  *G09G 5/12* (2006.01)
  *H04N 7/14* (2006.01)
  *H04N 7/15* (2006.01)

(52) U.S. Cl.
  CPC ........... *G06F 13/4282* (2013.01); *G09G 5/12* (2013.01); *G01C 2009/066* (2013.01); *G06F 2213/0042* (2013.01); *G09G 2340/0492* (2013.01); *G09G 2370/00* (2013.01); *H04N 7/142* (2013.01); *H04N 7/15* (2013.01); *H04N 2007/145* (2013.01)

(56) References Cited

U.S. PATENT DOCUMENTS

| | | |
|---|---|---|
| 9,367,145 B2 | 6/2016 | Sheynblat et al. |
| 9,436,231 B2 | 9/2016 | Bevilacqua et al. |
| 9,495,018 B2 | 11/2016 | Kulik |
| 9,990,003 B2 | 6/2018 | Bailey |
| 2008/0174550 A1 | 7/2008 | Laurila et al. |
| 2009/0265671 A1 | 10/2009 | Sachs et al. |
| 2014/0009499 A1 | 1/2014 | Almalki et al. |
| 2015/0229883 A1 | 8/2015 | Lin et al. |
| 2015/0281299 A1 | 10/2015 | Moustafa et al. |
| 2016/0231415 A1* | 8/2016 | Liao ..................... G01S 5/0289 |
| 2018/0241966 A1 | 8/2018 | Reznik et al. |
| 2018/0262714 A1 | 9/2018 | Kim et al. |
| 2019/0098191 A1* | 3/2019 | Enke .................... G02B 27/646 |

* cited by examiner

COMPUTER RESOURCE UTILIZATION REDUCTION DEVICES

BACKGROUND

Computing devices of all types and functions are ubiquitous within today's society. These computing devices include display devices that display information to the user in the form of graphical user interfaces, text, images, and selectable buttons, among other user-interactive elements. Some of these computing devices may be operated in a plurality of orientations to allow the user more flexibility as to how information is displayed on the display device.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
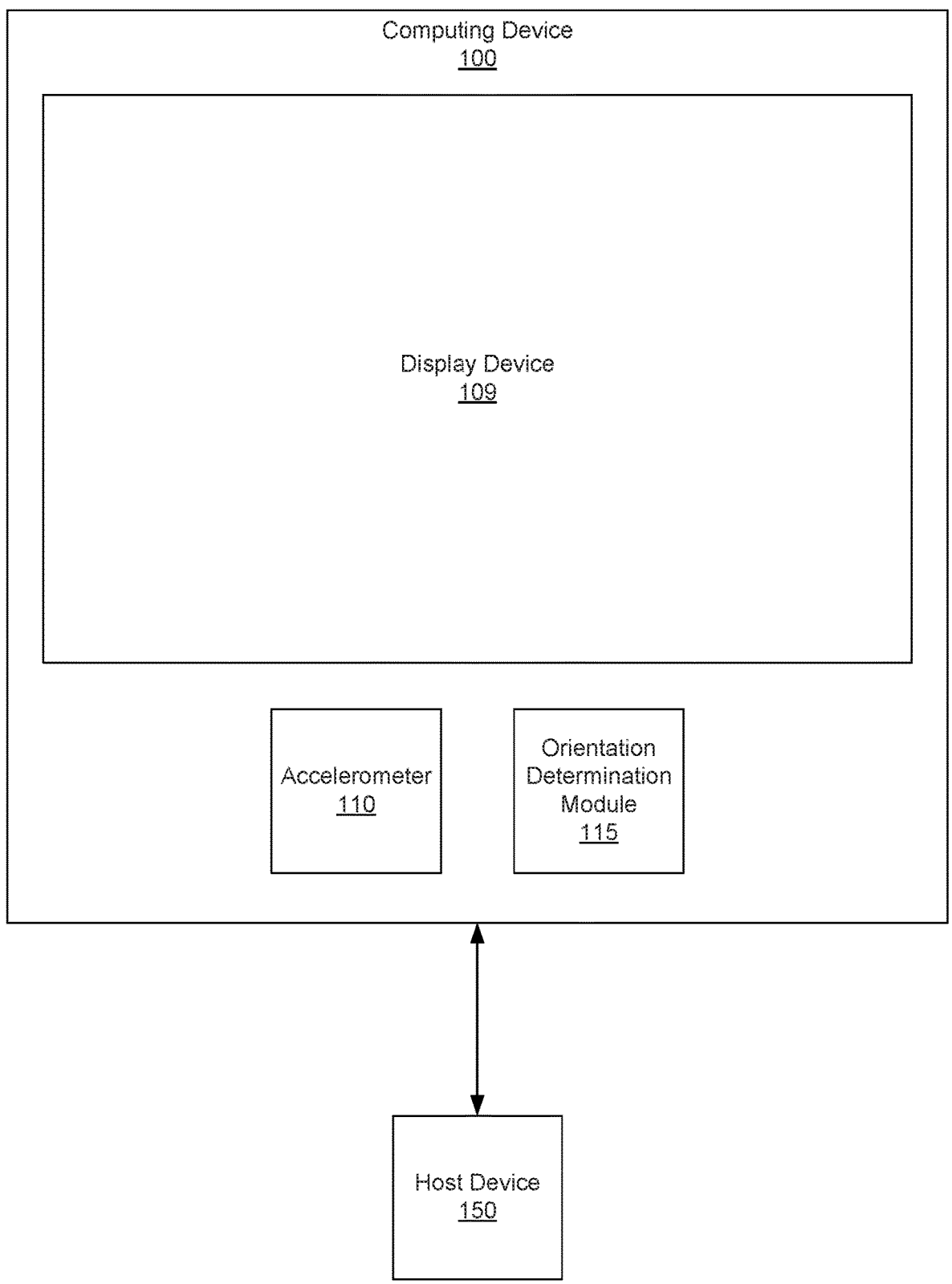
FIG. 1 is a block diagram of a computing device, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

As mentioned herein, some computing devices may be operated in a plurality of orientations to allow the user more flexibility as to how information is displayed on the display device. For example, mobile devices such as smart phones and tablet computing devices may include an orientation sensor called an accelerometer that enables the operating system and applications executed on the computing device to determine the proper orientation for the device's displayed content on the display device of the computing device. The accelerometer is capable of determining in which orientation the computing device is oriented and is able to tell which way is up with respect to gravity. The accelerometer sends a signal to a graphics processing unit (GPU) that indicates how the computing device is oriented with respect to gravity, and the GPU causes information displayed on the display device to be oriented with respect to gravity.

Such is the case with a center of room control (CoRC) device such as a CoRC developed and manufactured by HP, Inc. The CoRC may be connected to a host device such as a video conferencing system over a universal serial bus (USB). The use of a USB to connect the CoRC and the host device may create a situation where the host device tracks the CoRC device's orientation and displays content in a user-readable orientation. An accelerometer in the CoRC device may constantly send a steady stream of data at a sample rate of approximately 10 milliseconds (ms). However, transfer of data at these rates may impact system performance such as central processing unit (CPU) utilization, and may cause the computing device to slow down its performance and/or increase fan speed which could result in acoustic noise, even in instances when the computing device is not being rotated or re-oriented.

Examples described herein provide a computing device. The computing device includes a display device, an accelerometer, and an orientation determination module. The orientation determination module sends orientation data obtained by the accelerometer to a host device at a first data transfer frequency referred to as a heartbeat. In addition, the orientation determination module compares a plurality of orientation data most recently received from the accelerometer for at least one axis of orientation to the current orientation data measurement. In response to a difference between the current measurement and any of the plurality of orientation data most recently received from the accelerometer exceeding a threshold, the computing device sends the current orientation data to the host device at a second data transfer frequency, and adjusts content displayed on the display device based on orientation data sent to and processed by the host device. The host device may then send instructions to the computing device as to how to display the content on the display device, which, in examples where the display device is reoriented and the difference between the current measurement and any of the plurality of orientation data most recently received from the accelerometer exceeds a threshold, may be upside down relative to the previous orientation of the content on the display device.

The orientation determination module suppresses the transmission of the orientation data to the host device at the second data transfer frequency until the threshold has been exceeded. Further, the orientation determination module, in response to the threshold being exceeded, sends the orientation data to the host device via a universal serial bus (USB) that connects the computing device to the host device. In an example, the display device is a center of room control (CoRC) device coupled to the host device. Further, the second data transfer frequency is a higher data transfer frequency than the first data transfer frequency.

Examples described herein also provide a system for reducing computing resource utilization associated with orientation of data on a display device. The system includes a center of room control (CoRC) device, and a host computing device coupled to the CoRC device via a universal serial bus (USB) bus connection. The CoRC device includes a display device, a sensor, and a measurement module. The measurement module sends data obtained by the sensor to the host computing device at a first data transfer frequency referred to as a heartbeat. In parallel, the measurement module compares a plurality of data most recently received from the sensor to a current data measurement. In response to a difference between the current data most recently received and any of the plurality of data exceeding a threshold, the CoRC sends the current data measurement to the host device at a second data transfer frequency.

The measurement module adjusts operation of the CoRC device based on instructions from the host device. In one example, the senor is an accelerometer, and the accelerometer measures at least one axis of orientation of the CoRC device. Further, the second data transfer frequency is a higher data transfer frequency than the first data transfer frequency.

Examples described herein also provide a method of reducing computing resource utilization associated with orientation of data on a display device. The method includes, with an accelerometer electrically coupled to the display device, sending a heartbeat of orientation data to a host device at a first data transfer frequency. Further, the method includes with a processor, comparing a plurality of orientation data most recently received from the accelerometer for at least one axis of orientation to a current data orientation measurement. In response to a difference between the current data orientation measurement and any of the plurality of orientation data most recently received exceeding a threshold, sending the current orientation data to the host device at a second data transfer frequency. The method also includes adjusting the orientation of data displayed on the display device based on instructions from the host device. The heartbeat signal and the data sent at the second data transfer frequency are sent to the host device in parallel in instances where the threshold is exceeded.

The heartbeat of orientation data synchronizes the orientation of the data displayed on the display device with the output of the host device. The second data transfer frequency is a higher data transfer frequency than the first data transfer frequency. Further, the method may also include suppressing the delivery of the orientation data to the host device until the threshold has been exceeded.

As used in the present specification and in the appended claims, the term "frequency" is meant to be understood broadly as the number of occurrences of a repeating event per unit of time and may be measured in Hertz (Hz). The period is the duration of time of one cycle in the repeating event, so the period is the reciprocal of the frequency. In the examples described herein, data transfer frequencies may be defined as the period between transfer of data packets between two computing devices.

Turning now to the figures, FIG. 1 is a block diagram of a computing device (100), according to an example of the principles described herein. The computing device (100) may include a display device (109). Further, the computing device (100) may include a sensor such as an accelerometer (110) whose purpose is to detect events or changes in its environment and send the information to other electronics such as the computing device (100) or the host device (150) coupled to the computing device (100). Thus, an accelerometer (110) may detect at least one state of the computing device such as, for example, a position in space or an orientation of the computing device (100). Although an accelerometer (110) is used to describe a sensor for use in connection with the computing devices (100) within the examples described herein, any type or number of sensors may be used within the devices, systems, and methods described herein. For example, the sensors may include accelerometers, light sensors such as photodetectors, proximity sensors, motion sensors, temperature sensors, magnetic field sensors, gravity sensors, humidity sensors, moisture sensors, vibration sensors, pressure sensors, electrical field sensors, sound sensors, biosensors, among other types of sensors, and combinations thereof.

The computing device (100) may also include an orientation determination module (115). The orientation determination module (115), when executed or otherwise implemented by a processor of the computing device (100), sends a heartbeat of, for example, orientation data obtained by the accelerometer (110) to the host device (150) at a first data transfer frequency. The data transmitted as the heartbeat signal includes, for example, packets of orientation data from the accelerometer (110) that informs the host device (150) of the orientation of the computing device (100) in the x, y, and z planes in space. This heartbeat signal provides synchronization as to the orientation of the data displayed on the display device (109) between the computing device (100) and the host device (150) based on the output of the host device (150) and instructions received from the host device (150). The first data transfer frequency may be a relatively less frequent data transfer as compared to a second data transfer frequency so as to suppress or reduce the delivery of orientation data from the accelerometer (110) (or other types of data obtained by other types of sensors) to the host device (150). In one example, the heartbeat signal, being orientation data obtained by the accelerometer (110), may be sent at a frequency of approximately once per second (i.e., 1 Hz) for example, or at a relatively lower frequency than may be sent when the orientation of data displayed on the display device (109) is to change by the host device (150) due to the reorientation of the computing device (100). In this manner, the acceleration data sent via the heartbeat signal is less frequent when no change in the orientation of the computing device is detected, and the utilization of the host device's (150) computing resources is greatly reduced.

The second data transfer frequency may be once every 10 ms or 100 Hz. In other words, a packet of data at the second data transfer frequency may be sent once every 10 ms or at a frequency of 100 Hz. The data transmitted at the second data transfer frequency includes, for example, packets of orientation data from the accelerometer (110) that informs the host device (150) of the orientation of the computing device (100) in the x, y, and z planes in space.

The heartbeat signal is sent to the host device (150) at the first data transfer frequency as opposed to sending data at the second data transfer frequency so that less data transfer instances occurs in order to reduce utilization of computing resources within the host device (150) such as processing devices, data storage devices, peripheral device adaptors, logical buses, and other computing resources. Although the heartbeat signal including orientation data representing the orientation of the computing device (100) is sent to the host device (150) at the first data transfer rate, the accelerometer (110) may actually detect the orientation of the computing device (100) at a higher frequency such as once every 10 ms (at 100 Hz) or faster. The computing device (100) intentionally suspends or suppresses the data from being transferred to the host device (100) at the second data transfer frequency while the device is at rest (i.e. not moving or not being reoriented).

Thus, these two actions are taken by the display device (109) in parallel including sending the heartbeat signal to the host device (150) at the lower frequency for data transfer (i.e., the first data transfer frequency), and comparing current data received from the accelerometer (110) to at least one other most recently received measurement by the accelerometer (110) to determine if the difference between them exceed a threshold in order to trigger the sending of the data from the accelerometer (110) upstream to the host device (150). These two processes operate in parallel, but are executed or implemented independent of one another.

The computing device (100) compares a plurality of orientation data most recently received from the accelerometer (110) for at least one axis of orientation of the computing device (100) to a current orientation data measurement. In one example, the most recent four sets of orientation data sensed by the accelerometer (110) may be compared to a current set of orientation data from the accelerometer (110). Once compared, a determination may be made as to whether the orientation of the computing device (100) has changed. For example, in response to a difference between the current measurement and any of the plurality of orientation data most recently received from the accelerometer (110) exceeding a threshold, the computing device (100) may interpret the value exceeding the threshold as indicating that a change in the orientation of the computing device (100) has occurred. In response to the threshold being exceeded, the computing device (100) may send the current orientation data to the host device (150) at the second data transfer frequency such as at a frequency of approximately once every 10 ms or 100 Hz. The computing device (100) may also continuously send new data sets to the host device (150) at the second data transfer frequency until the data sets that are detected are no longer different from one another with respect to the threshold. When the data sets are no longer different, the transfer of orientation data from the accelerometer (110) of the computing device (100) to the host device (150) at the second data frequency may be suspended until the threshold has been again exceeded.

The orientation of the data displayed on the display device (109) may be adjusted based on instructions from the host device (150). For example, if the orientation data sent to the host device (150) indicates to the host device (150) that the computing device has been re-oriented by turning the computing device (100) upside down such that the data presented on the display device (109) are oriented upside down, the host device (150) may process the data in the form of text, images, video, GUIs, interactive elements, and other displayable elements that it sends to the computing device (100) and instruct the computing device (100) to re-orient the data presented on the display device (109) so that it is oriented in a user-readable orientation The host determines how to orient the data to be displayed on the display device (109) of the computing device (150) based on accelerometer data it receives from the computing device (100). Said another way, the host device (150) adjusts content displayed on the display device (109) based on orientation data received by the host device (150) from the accelerometer (110) of the computing device (100).

Figure 2:
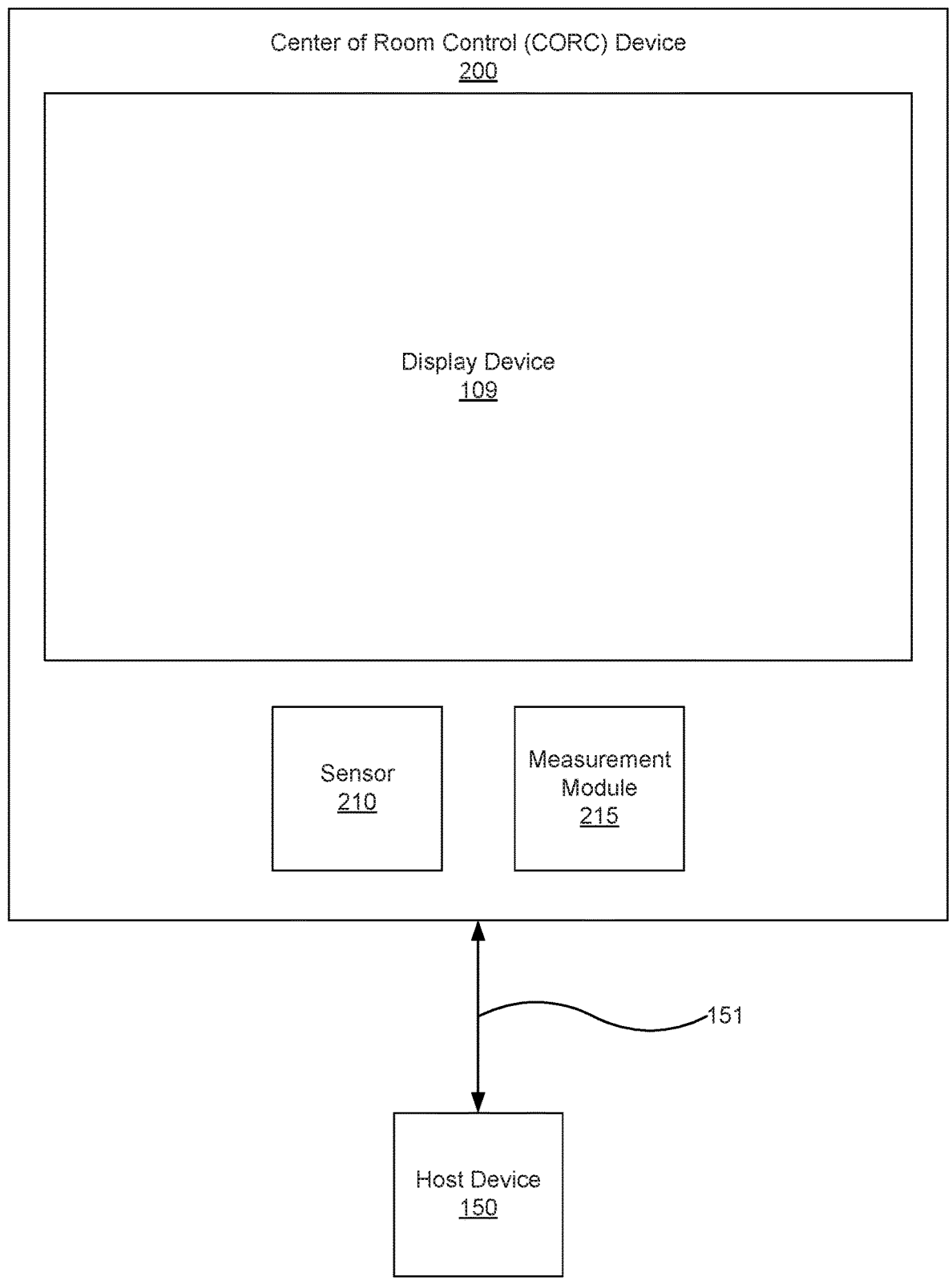
FIG. 2 is a block diagram of a center of room control (CoRC) device, according to an example of the principles described herein.

FIG. 2 is a block diagram of a center of room control (CoRC) device (200), according to an example of the principles described herein. The CoRC device (200) includes elements that function in a similar manner as the elements of the computing device (100) described herein in connection with FIG. 1. For example, the CoRC device (200) includes a display device (109) that displays information to a user. Further, the CoRC device (200) includes sensors (210) such as the accelerometer (110) of the computing device (FIG. 1, 100) that may detect events or changes in the environment of the CoRC device (200), and send the information to other electronics such as other elements of the CoRC device (200) or the host device (150) coupled to the CoRC device (200). Further, the measurement module (215) of the CoRC device (200) functions in a similar manner as the orientation determination module (FIG. 1, 115) by measuring any detected event changes in the environment of the CoRC device (200) and sending that data to the host device (150) in the form of the heartbeat signal at the first data transfer frequency or in the form of the regular signals sent to the host device (150) at the relatively more frequent second data transfer frequency as similarly described in connection with the orientation determination module (FIG. 1, 115). However, as mentioned herein, the computing devices including the CoRC device (200) may include any type of sensor (210) that may be used to detect any event or change in the environment of the CoRC device (200) via a measurement module (215) that measures a characteristic of that event or change.

The CoRC device (200) in the examples described herein may be any device through which a user may interact with a host device (150). In one example, the host device (150) is used in a video conferencing environment where the host device (150) may include audio input and output devices for use in communicating via a video conferencing instance, a number of communication ports to couple peripheral devices such as the CoRC device (200) to the host device (150), computing elements such as processing devices and data storage devices, optical drives to allow the reading an display of data on an optical disc, wired or wireless communication devices to communicate with display devices used to display video conferencing images in addition to the CoRC device (200), other features, and combinations thereof.

The CoRC device (200), coupled to the host device (150) via a universal serial bus (USB) connection (151), serves as an interactive display through which users may control the host device (150). In one example, the USB connection (151) is a USB Type C connection. Further, in one example, the video conferencing system including the CoRC device (200) and the host device (150) may be an ELITE SLICE computing system developed and manufactured by HP, Inc.

Figure 3:
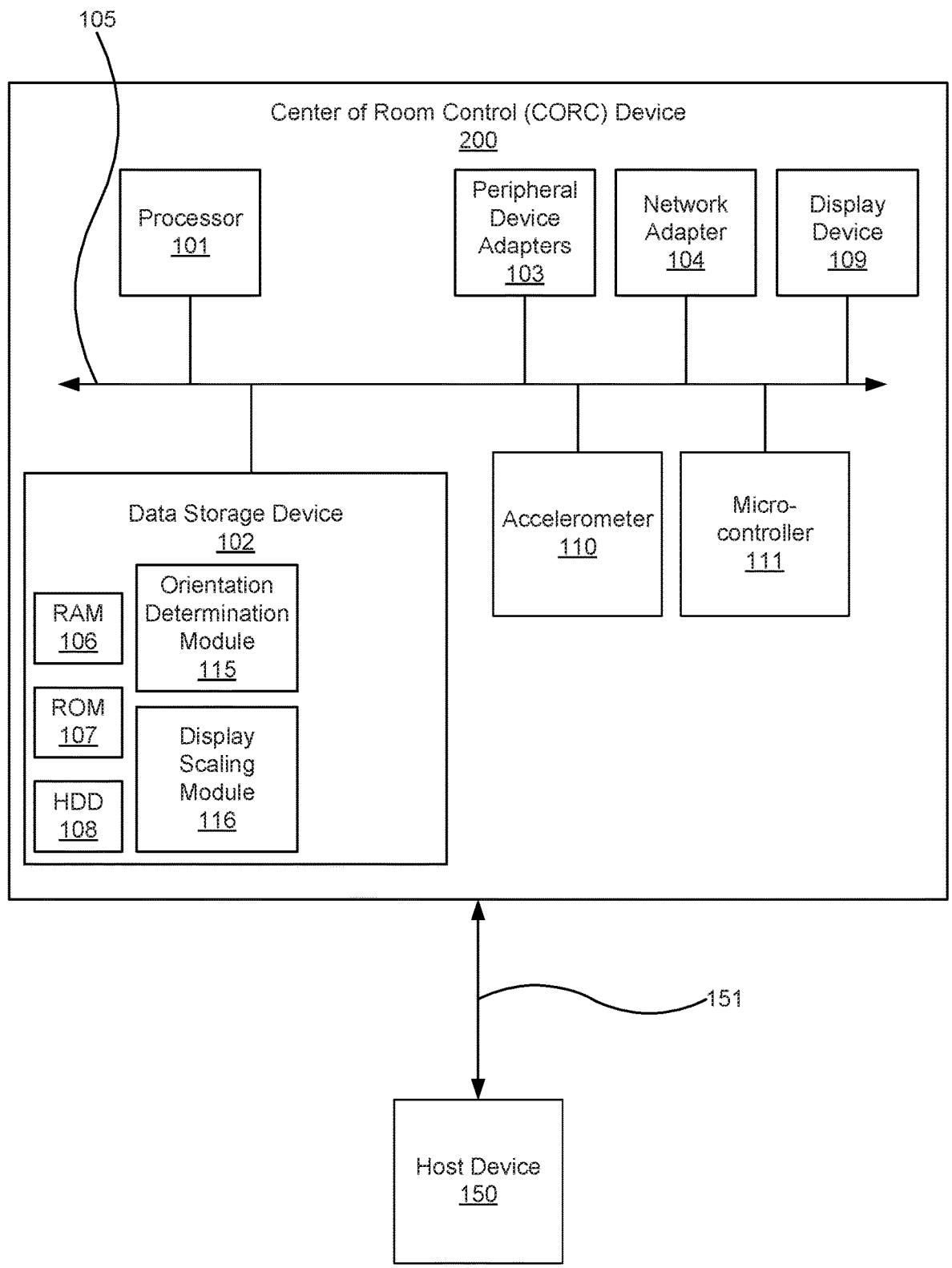
FIG. 3 is a block diagram of a center of room control (CoRC) device, according to an example of the principles described herein.
Figure 4:
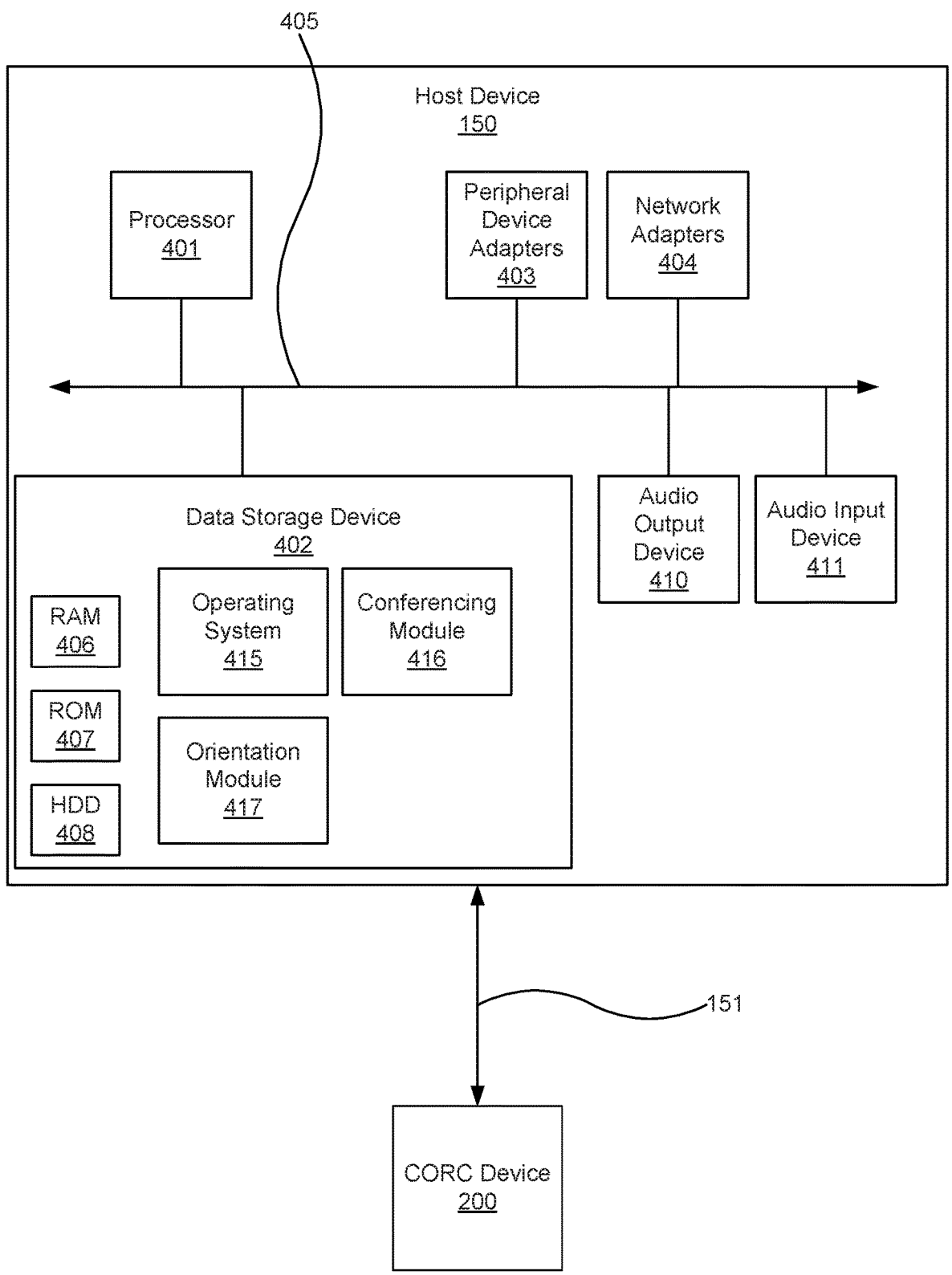
FIG. 4 is a block diagram of a host device, according to an example of the principles described herein.

FIG. 3 is a block diagram of a center of room control (CoRC) device (200), according to an example of the principles described herein. Further, FIG. 4 is a block diagram of a host device (150), according to an example of the principles described herein. FIGS. 3 and 4 depict a system for reducing computing resource utilization associated with orientation of data on a display device that includes the CoRC device (200) and the host computing device (150). To achieve its desired functionality, the CoRC device (200) includes various hardware components. Among these hardware components may be a processor (101), a data storage device (102), a number of peripheral device adapters (103), a number of network adapters (104), the display device (109), an accelerometer (110), and a microcontroller (111). These hardware components may be interconnected through the use of a number of busses and/or network connections. In one example, the processor (101), data storage device (102), number of peripheral device adapters (103), number of network adapters (104), display device (109), accelerometer (110), and microcontroller (111) may be communicatively coupled via a bus (105).

In the examples described herein, even though the CoRC device (200) is depicted as including a processor (101), a network adapter (104), an HDD (108) within the data storage device (102), or other devices described herein, the CoRC may be less of a computing device that is capable of performing a myriad of processes, but may, instead, be a "dumb" computing device or passive computing device that lacks most processing capabilities other computing devices or smart devices may perform and receives most of its instructions from the host device (150) where the host device (150) performs most of the data processing instead of the CoRC device (200). Further, in one example, the processor (101) may reside within the data storage device (102). Still further, in one example, the processor (101) and the microcontroller (111) may be one and the same device since the microcontroller (111) includes a processing device. Thus, in the examples described herein, the host device (150) performs a large portion of the data processing for the system made up of the CoRC device (200) and the host device (150).

The processor (101) may include the hardware architecture to retrieve executable code from the data storage device (102) and execute the executable code. The executable code may, when executed by the processor (101), cause the processor (101) to implement at least the functionality of, with the accelerometer (110) electrically coupled to the display device (109), sending a heartbeat of orientation data to the host device (150) at a first data transfer frequency. Further, the executable code may, when executed by the processor (101), cause the processor (101) to implement at least the functionality of, with a processor, comparing a plurality of orientation data most recently received from the accelerometer (110) for at least one axis of orientation to a current data orientation measurement, and, in response to a difference between the current data orientation measurement and any of the plurality of orientation data most recently received exceeding a threshold, sending the current orientation data to the host device at a second data transfer frequency. Further, the executable code may, when executed by the processor (101), cause the processor (101) to implement at least the functionality of adjusting the orientation of data displayed on the display device (109) based on instructions from the host device (150) In one example, the processor (101) may process instructions received from the host device (150), and reorient the data displayed on the display device (109). In another example, the host device (150) may perform the processing associated with reorientation of the data displayed on the display device (109), and directly reorient the data displayed on the display device (109) through communication via the bus (105) so as to allow the orientation of the displayed data to be controlled in and by the host device (150). These and other functionalities are according to the methods of the present specification described herein. In the course of executing code, the processor (101) may receive input from and provide output to a number of the remaining hardware units.

The data storage device (102) may store data such as executable program code that is executed by the processor (101) or other processing device. As will be discussed, the data storage device (102) may specifically store computer code representing a number of applications that the processor (101) executes to implement at least the functionality described herein. The data storage device (102) may include various types of memory modules, including volatile and nonvolatile memory. For example, the data storage device (102) of the present example includes Random Access Memory (RAM) (106), and Read Only Memory (ROM) (107. Many other types of memory may also be utilized, and the present specification contemplates the use of many varying type(s) of memory in the data storage device (102) as may suit a particular application of the principles described herein. In certain examples, different types of memory in the data storage device (102) may be used for different data storage needs. For example, in certain examples the processor (101) may boot from Read Only Memory (ROM) (107), and execute program code stored in Random Access Memory (RAM) (106).

The data storage device (102) may include a computer readable medium, a computer readable storage medium, or a non-transitory computer readable medium, among others. For example, the data storage device (102) may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain, or store a program for use by or in connection with an instruction execution system, apparatus, or device.

The peripheral device adapters (103) and network adaptors (104) in the CoRC device (200) enable the processor (101) to interface with various other hardware elements, external and internal to the CoRC device (200) including the host device (150) via the USB connection (151). For example, the peripheral device adapters (103) may provide an interface to input/output devices, such as, for example, display devices connected to the host device (150) in addition to the display device (109), a touch screen element implemented with the display device (109), a mouse, a keyboard, and video conferencing tools, among others. The peripheral device adapters (103) may also provide access to other external devices such as an external storage device, a number of network devices such as, for example, servers, switches, and routers, client devices, other types of computing devices, and combinations thereof.

The display device (109) may be provided to allow a user of the CoRC device (200) to interact with the functionality of the CoRC device (200) and the host device (150). The peripheral device adapters (103) may also create an interface between the CoRC device (200) and the host device (150), a printing device, or other media output devices.

The CoRC device (200) may, when executed by the processor (101), display the number of graphical user interfaces (GUIs), text, images, interactive elements, and other elements on the display device (109) associated with the executable program code representing the number of applications stored on the data storage device (102). These elements allow a user to control at least one function of the host device (150) such as, for example, the creation and interaction within a video conferencing environment or instance. In these examples, as described herein, the CoRC may be less of a computing device that is capable of performing a myriad of processes. Instead, the CoRC (200) be a "dumb" computing device or passive computing that lacks most processing capabilities other computing devices or smart devices may perform and receives most of its instructions from the host device (150) where the host device (150) performs most of the data processing instead of the CoRC device (200). Further, in one example, the processor (101) may reside within the data storage device (102). Still further, in one example, the processor (101) and the microcontroller (111) may be one and the same device since the microcontroller (111) includes a processing device. Thus, in some examples, the host device (150) provides the processing power for the system made up of the CoRC device (200) and the host device (150).

The accelerometer (110) may be any device that is capable of sensing the orientation of the CoRC device (200) using its ability to measure proper acceleration along any axis in 3D space, proper acceleration being the acceleration (or rate of change of velocity) of the CoRC device (200) in its own instantaneous rest frame. In one example, the accelerometer (110) may measure the proper acceleration of the CoRC device (200) a number of times in a given second such as, for example, once every 10 ms (at 100 Hz) or more frequently.

The microcontroller (111) may be provided in addition to or integrated with the processor (101), and may include processing architecture and/or firmware that determines when to send the heartbeat signal, being orientation data obtained by the accelerometer (110), to the host device (150) at the first data transfer frequency and when to send orientation data detected by the accelerometer (110) at the second data transfer frequency based on movement of the CoRC device (200).

The CoRC device (200) further includes a number of modules used in the implementation of the systems and methods described herein. The various modules within the CoRC device (200) include executable program code that may be executed separately. In this example, the various modules may be stored as separate computer program products. In another example, the various modules within the CoRC device (200) may be combined within a number of computer program products; each computer program product including a number of the modules.

The CoRC device (200) may include an orientation determination module (115) to, when executed by the processor (101), determine an orientation of the CoRC device (200) based on data received from the accelerometer (110). The orientation determination module (115) may utilize the microcontroller (111) to send either the heartbeat signal to the host device (150) at the first data transfer frequency or the orientation data detected by the accelerometer (110) at the second data transfer frequency based on whether the CoRC device (200) is detected as accelerating through space. In this manner, the orientation determination module (115), when executed by the processor (101), serves to reduce the computing load on the host device (150) by sending data at varying frequencies in order to reduce the processing of data performed by the host device (150). In one example, the processor (101) and the microcontroller (111) may be one and the same device since the microcontroller (111) includes a processing device. Thus, in some examples, the host device (150) provides the processing power for the system made up of the CoRC device (200) and the host device (150). In one example, the blocks depicted in the figures may indicate computing logic, and the function of these individual blocks may be integrated into the same integrated circuit.

The CoRC device (200) may include a display scaling module (116) to, when executed by the processor (101), cause the information displayed on the CoRC device (200) to be scaled. The display scaling module (116) converts the resolution of the images and video sent from the host device (150) to a native resolution of the display device (109). The scaling module (116) may receive video data defining a video resolution from the operating system (415) of the host device (150) and converts and maps that video data into the native resolution of the display device (109). In one example, light emitting diodes (LEDs) in red, green, and blue (RGB), for example, and associated field effect transistors (FETs) turn on and off based on the instructions from the host device (150) and the processing of the scaling module (116). The scaling module (116) considers the orientation of the CoRC device (200). For example, as the CoRC device (200) is rotated, the GUIs, text, images, and interactive elements displayed thereon may be scaled to ensure that these elements are displayed within the boarders of the display device (109) of the CoRC device (200) and without distortion. Thus, for example, if the CoRC device (200) were oriented from a landscape orientation to a portrait orientation, or when rotated 180 degrees, the display scaling module (116) causes the GUIs, text, images, and interactive elements displayed thereon to be scaled and presented in a user-identifiable shape, size, and aspect ratio. In another example, the host device (150) may perform all the processing regarding the scaling and display of the GUIs, text, images, and interactive elements using the orientation module (FIG. 4, 417) described herein in connection with FIG. 4. The host device (150) generates all the images and video that is to be displayed on the CoRC device (200) in the examples described herein, and the orientation module (FIG. 4, 417) may further ensure that the images and video including the GUIs, text, and interactive elements are oriented on the display device based on the data collected by the accelerometer (110) of the CoRC device (200) to the host device (150) for processing. In this manner, the host device (150) and not the CoRC device (150) is processing the data, and the CoRC device (200) is more of a passive device that is controlled by the host device (150).

FIG. 4 is a block diagram of a host device (150), according to an example of the principles described herein. The host device (150) includes several elements similar to those elements included within the CoRC device (200) of FIG. 3, including a processor (401), a data storage device (402) (including RAM (406), ROM (407), and HDD (408)), peripheral device adapters (403), network adaptors (404), and a bus (405). Description of these elements are provided above in connection with the corresponding elements of the CoRC device (200) of FIG. 3.

The host device (150) also may include an audio output device (410) such as a number of speakers through which the host device (150) may output audio signals such as those received within a video conferencing environment where the users may hear, for example, users participating in the video conference. Further, audio input devices (411) such a microphones may be included in the host device (150) to allow the recordation and transmission of users' voices during the video conferencing process.

Like the CoRC device (200), the host device (150) may also include a number of modules used in the implementation of the systems and methods described herein. The various modules within the host device (150) include executable program code that may be executed separately. In this example, the various modules may be stored as separate computer program products. In another example, the various modules within the host device (150) may be combined within a number of computer program products; each computer program product including a number of the modules.

The host device (150) may include an operating system (415) to, when executed by the processor (101), manage computer hardware and software resources and provides common services for computer programs such as the video conferencing programs executed by the host device (150). Further, the host device (150) may include a conferencing module (416) to, when executed by the processor (101), cause a video conferencing environment to be presented to users for interaction.

The host device (150) may also include an orientation module (417) to, when executed by the processor (101), determine an orientation of the CoRC device (200) based on the heartbeat data received from the accelerometer (110) of the CoRC device (200) at the first data transfer frequency and the orientation data sent to the host device (150) at the second data transfer rate in response to a determination that the differences between a current measurement from the accelerometer (110) and any of a plurality of orientation data most recently received from the accelerometer (110). With this data transmitted to the host device (150), the orientation module (417) may send instructions to the CoRC device (200) to adjust the manner in which the GUIs, text, images, and interactive elements are displayed on the display device (109) of the CoRC device (200). The host device (150) generates all the images and video that is to be displayed on the CoRC device (200) in the examples described herein, and the orientation module (FIG. 4, 417) may further ensure that the images and video including the GUIs, text, and interactive elements are oriented on the display device based on the data collected by the accelerometer (110) of the CoRC device (200) to the host device (150) for processing. In this manner, the host device (150) and not the CoRC device (150) is processing the data, and the CoRC device (200) is more of a passive device that is controlled by the host device (150). In this manner, the host device (150) determines the correct and appropriate manner of displaying elements on the CoRC device (200) based on the orientation of the CoRC device (200).

Figure 5:
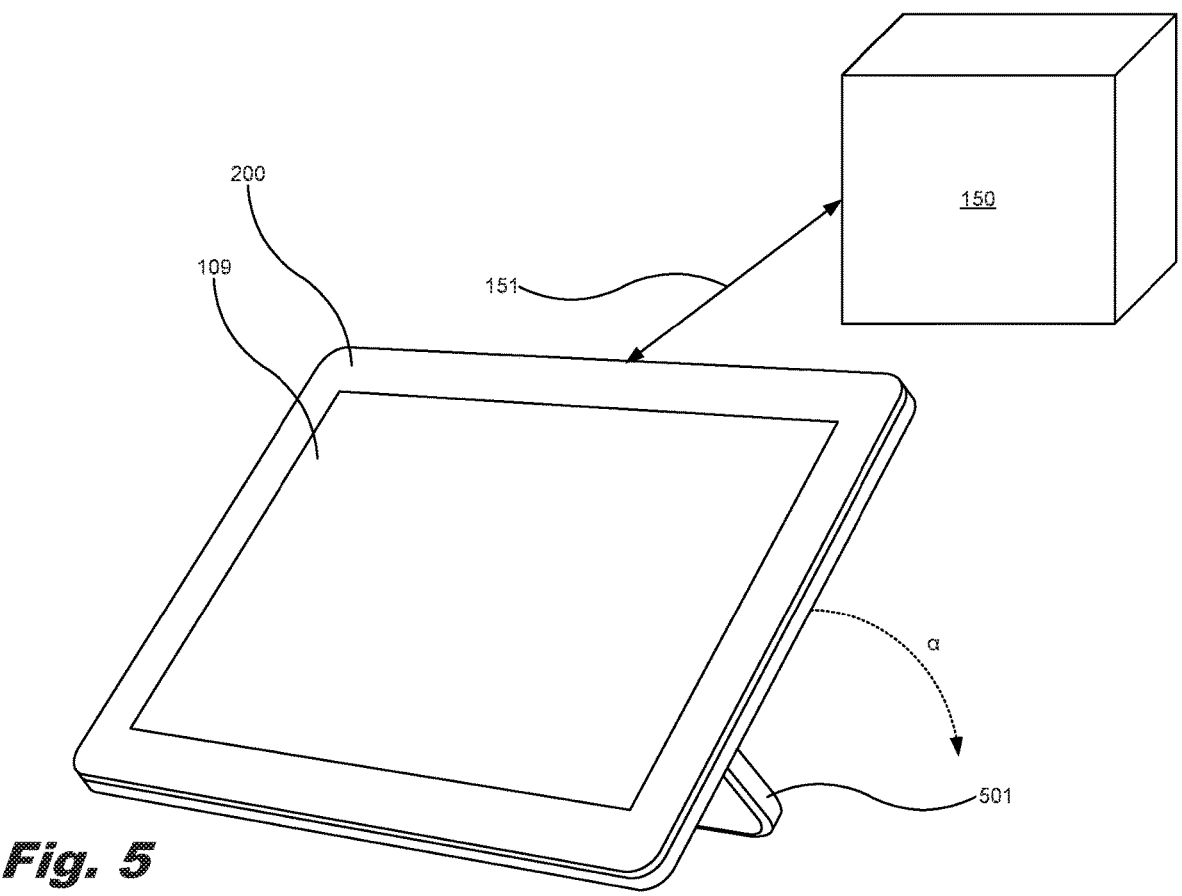
FIG. 5 is a perspective view of a CoRC device in a first orientation and coupled to a host device, according to an example of the principles described herein.
Figure 6:
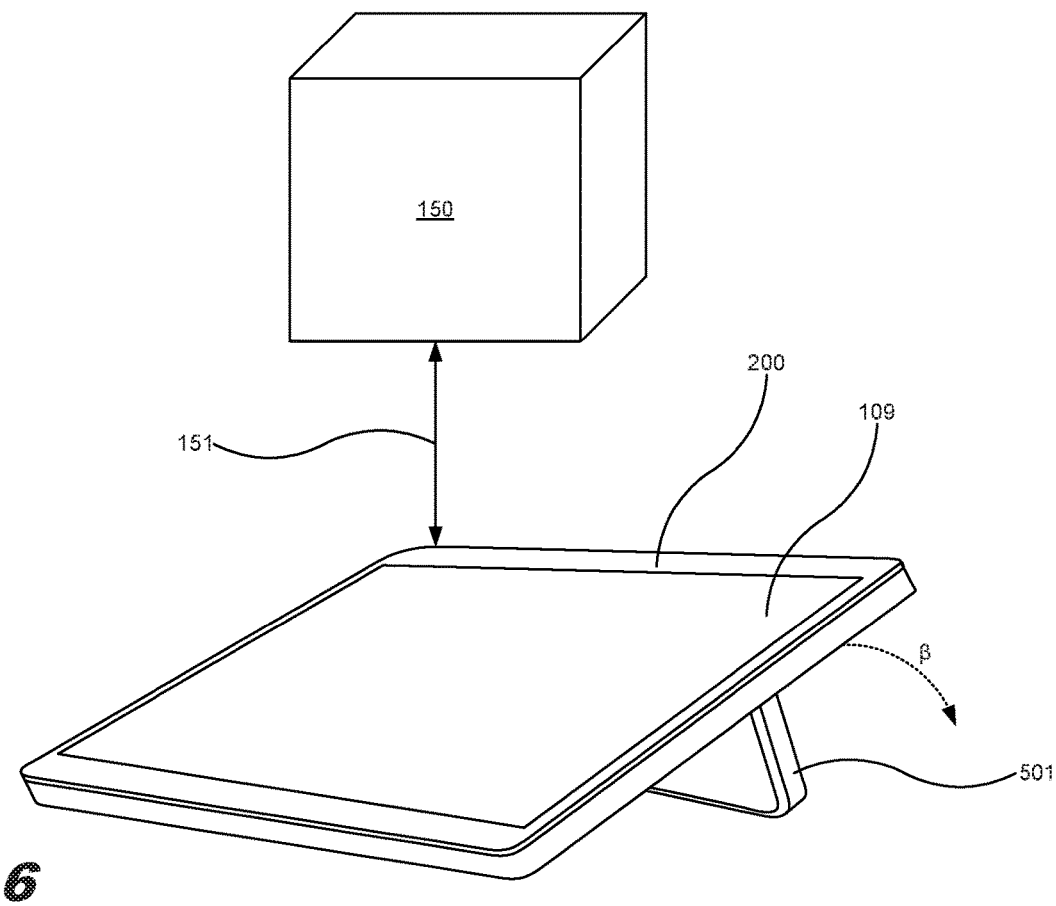
FIG. 6 is a perspective view of a CoRC device in a second orientation and coupled to a host device, according to an example of the principles described herein.

FIG. 5 is a perspective view of the CoRC device (200) in a first orientation and coupled to the host device (150), according to an example of the principles described herein. Further, FIG. 6 is a perspective view of the CoRC device (200) in a second orientation and coupled to a host device (150), according to an example of the principles described herein. The difference between the orientation of the CoRC device (200) in FIG. 5 with respect to FIG. 6 is that the CoRC device (200) has been flipped upside down. As depicted in FIG. 5, the CoRC device (200) is oriented in a more upright orientation relative to the more reclined orientation of the CoRC device (200) depicted in FIG. 6. In FIG. 5, the angle at which the CoRC device (200) is oriented with respect to a surface on which it sits such as a table is indicated as angle α. Further, in FIG. 6, the angle at which the CoRC device (200) is oriented with respect to the surface is indicated as angle β Angle α may be a larger angle than angle β due to the positioning of the support (501) coupled to the CoRC device (200). In one example, angle α may be approximately between 50 and 75 degrees relative to the surface on which the CoRC device (200) sits, and angle β may be between 10 and 35 degrees relative to the surface on which the CoRC device (200) sits.

Because the support (501) is positioned at an off-center location of the back of the CoRC device (200), the CoRC device (200) may be rotated to orient the CoRC device (200) at the two angles depicted in FIGS. 5 and 6. These two angles of operation of the CoRC device (200) allow for the user to view the display device (109) at two different angles such as if the user were sitting down or standing up while operating or interacting with the CoRC device (200).

Figure 7:
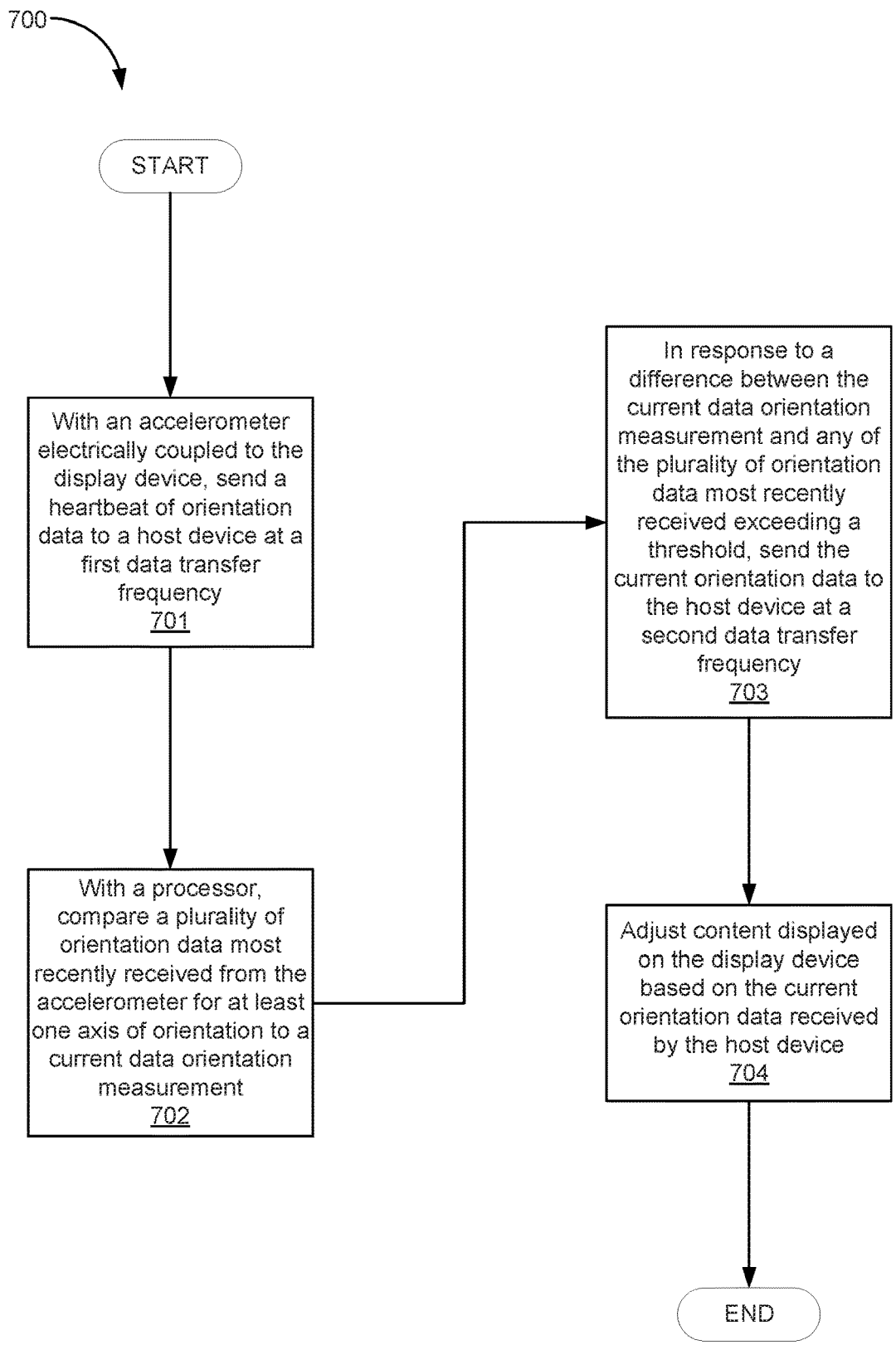
FIG. 7 is a flowchart showing a method of reducing computing resource utilization associated with orientation of data on a display device, according to an example of the principles described herein.
Figure 8:
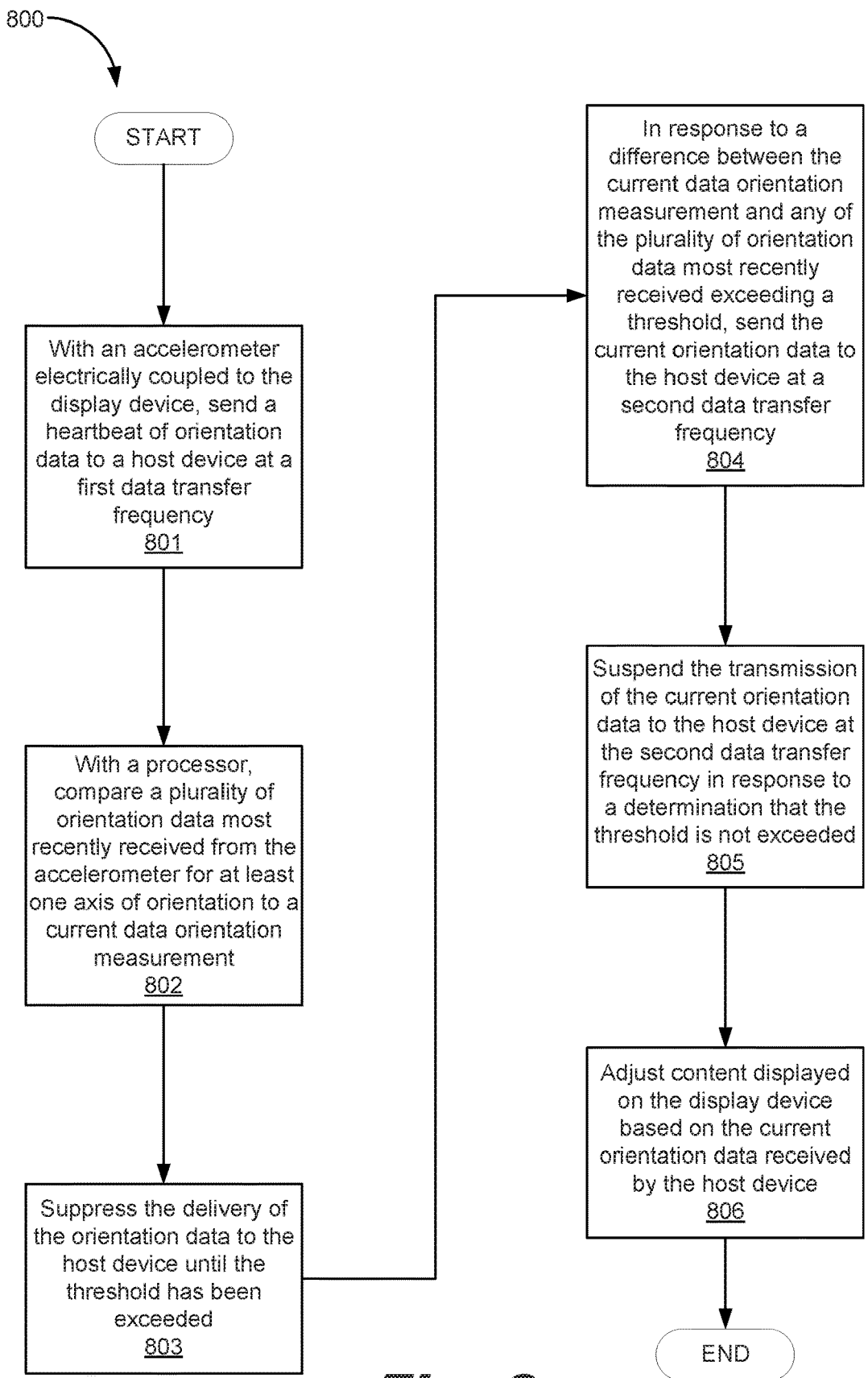
FIG. 8 is a flowchart showing a method of reducing computing resource utilization associated with orientation of data on a display device, according to an example of the principles described herein.

Having described the manner in which the CoRC device (200), the host device (150), and their various elements function, the method by which reduction of computing resource utilization associated with orientation of data on a display device is achieved will now be described in connection with FIGS. 7 and 8. FIG. 7 is a flowchart showing a method (700) of reducing computing resource utilization associated with orientation of data on the display device (109), according to an example of the principles described herein. The method (700) may include, with an accelerometer (110) electrically coupled to the display device (109), sending (block 701) a heartbeat of orientation data to a host device (150) at a first data transfer frequency.

The method (700) may also include, with a processor (101), comparing (block 702) a plurality of orientation data most recently received from the accelerometer (110) for at least one axis of orientation to a current data orientation measurement. In response to a difference between the current data orientation measurement and any of the plurality of orientation data most recently received exceeding a threshold, the method (700) may include sending (block 703) the current orientation data to the host device at a second data transfer frequency. The content displayed on the display device may be adjusted (block 704) based on the current orientation data received by the host device (150).

The heartbeat of orientation data synchronizes the orientation of the data displayed on the display device (109) with the output of the host device (150). As described herein, the second data transfer frequency is a higher data transfer frequency than the first data transfer frequency. Further, the method may include suppressing the delivery of the orientation data to the host device (150) until the threshold has been exceeded. When the data sets are no longer different, the transfer of orientation data from the accelerometer (110) of the computing device (100) to the host device (150) at the second data frequency may be suspended until the threshold has been again exceeded FIG. 8 is a flowchart showing a method (800) of reducing computing resource utilization associated with orientation of data on a display device (109), according to an example of the principles described herein. The method (800) may include, with an accelerometer (110) electrically coupled to the display device (109), sending (block 801) a heartbeat of orientation data to a host device (150) at a first data transfer frequency, and with a processor (101), comparing (block 802) a plurality of orientation data most recently received from the accelerometer (110) for at least one axis of orientation to a current data orientation measurement.

Further, the method (800) may include suppressing (block 803) the delivery of the orientation data to the host device (150) until the threshold has been exceeded. This ensures that orientation data is not continuously sent to the host device (150) at the second data transfer frequency unless an actual change in orientation of the CoRC device (200) has taken place. Instead, suppression (block 803) in this manner results in the heartbeat being sent to the host device (150) at the slower, first data transfer frequency in order to save computing resources within the host device (150).

In response to a difference between the current data orientation measurement and any of the plurality of orientation data most recently received exceeding the threshold, the method (800) may include sending (block 804) the current orientation data to the host device (150) at the second data transfer frequency. The transfer of current orientation data to the host device (150) at the second data transfer frequency occurs as long as the CoRC device (200) is moving and the threshold is exceeded. Sending the (block 804) the current orientation data to the host device at the second data transfer frequency provides for the ability of the host device (150) and CoRC device (200) to promptly react to the change of orientation of the CoRC device (200). In this manner, the resources of the host device (150) and CoRC device (200) are used at appropriate times and at appropriate computational rates so as to reduce the strain on the computing resources of the host device (150) and CoRC device (200) while still providing prompt responses to re-orientation of the CoRC device (200).

Further, the method (800) may include suspending (block 805) the transmission of the current orientation data to the host device at the second data transfer frequency in response to a determination that the threshold is not exceeded. Once the user has re-oriented the CoRC device (200), and the differences between a current orientation measurement from the accelerometer (110) and the a number of previous measurements no longer differ or their differences are below the threshold, the system including the CoRC device (200) and the host device (150) may return back to a state in which the heartbeat continues to be sent from the CoRC device (200) to the host device (150) at the first data transfer frequency and the transmission of the current orientation data to the host device at the second data transfer frequency is suspended.

Also, the content displayed on the display device may be adjusted (block 806) based on the current orientation data received by the host device (150), and in response to the threshold being exceeded at block 804. As in FIG. 7, the heartbeat of orientation data synchronizes the orientation of the data displayed on the display device (109) with the output of the host device (150) while the CoRC device (200) is not in motion. Further, as described herein, the second data transfer frequency is a higher data transfer frequency than the first data transfer frequency.

In one example, the host device (150) may cause a number of manual settings to be adjustable by the user via a number of GUIs via execution of the operating system (415) executed on the host device (150). For example, the host device (150) may present a display settings GUI that allows the user to manually override the orientation setting the host device (150) is instructing the CoRC (200) to present the content in order to reorient the content displayed on the display device (109).

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processor (101) of the CoRC device (200), the microcontroller (111), the processor (401) of the host device, other programmable data processing apparatus, or combinations thereof, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe a computing device. The computing device includes a display device, an accelerometer, and an orientation determination module. The orientation determination module sends a heartbeat of orientation data obtained by the accelerometer to a host device at a first data transfer frequency, and compares a plurality of orientation data most recently received from the accelerometer for at least one axis of orientation to the current orientation data measurement. In response to a difference between the current measurement and any of the plurality of orientation data most recently received from the accelerometer exceeding a threshold, the computing device sends the current orientation data to the host device at a second data transfer frequency, and content displayed on the display device based on the current orientation data received by the host device.

The systems and methods described herein include a non-hardware solution that is very responsive without monopolizing computing resources within the computing device (e.g., CoRC) or the host computing device. Further, this disclosure provides a method to reduce the system activity required to handle the accelerometer data without sacrificing accuracy of the accelerometer.

The preceding description has been presented to illustrate and describe examples of the principles described. This description is not intended to be exhaustive or to limit these principles to any precise form disclosed. Many modifications and variations are possible in light of the above teaching.

What is claimed is:

1. A computing device, comprising:
a display device;
an accelerometer; and
an orientation determination module to:
send a heartbeat of orientation data obtained by the accelerometer to a host device at a first data transfer frequency;
compare a plurality of orientation data most recently received from the accelerometer for at least one axis of orientation to the current orientation data measurement;
in response to a difference between the current measurement and any of the plurality of orientation data most recently received from the accelerometer exceeding a threshold, send the current orientation data to the host device at a second data transfer frequency, wherein the second data transfer frequency is a higher data transfer frequency than the first data transfer frequency; and
output data displayed on the display device based on orientation instructions received from the host device.

2. The computing device of claim 1, wherein the orientation determination module suppresses the transmission of the orientation data to the host device until the threshold has been exceeded.

3. The computing device of claim 1, wherein the orientation determination module, in response to the threshold being exceeded, sends the orientation data to the host device via a universal serial bus (USB) that connects the computing device to the host device.

4. The computing device of claim 1, wherein the orientation determination module, in response to the threshold not being exceeded, suppresses the delivery of the orientation data to the host device at the first data transfer frequency.

5. The computing device of claim 1, wherein the host device is a video conferencing system, and the computing device is a center of room control (CoRC) device for the video conferencing system that is communicatively coupled to the host device.

6. A system for reducing computing resource utilization associated with orientation of data on a display device, comprising:

a center of room control (CoRC) device for a video conferencing system; and
a host computing device of the video conferencing system coupled to the CoRC device via a universal serial bus (USB) bus connection;
wherein the CoRC device comprises:
a display device;
a sensor; and
a measurement module to:
send a heartbeat of data obtained by the sensor to the host computing device at a first data transfer frequency;
compare a plurality of data most recently received from the sensor to a current data measurement; and
in response to a difference between the current data most recently received and any of the plurality of data exceeding a threshold, send the current data measurement to the host computing device at a second data transfer frequency, wherein the second data transfer frequency is a higher data transfer frequency than the first data transfer frequency.

7. The system of claim 6, wherein the measurement module adjusts operation of the CoRC device based on instructions from the host computing device.

8. The system of claim 6, wherein:
the sensor is an accelerometer, and the accelerometer measures at least one axis of orientation of the CoRC device.

9. A method of reducing computing resource utilization associated with orientation of data on a display device, comprising:
with an accelerometer electrically coupled to the display device, sending a heartbeat of orientation data to a host device at a first data transfer frequency;
with a processor, comparing a plurality of orientation data most recently received from the accelerometer for at least one axis of orientation to a current data orientation measurement;
in response to a difference between the current data orientation measurement and any of the plurality of orientation data most recently received exceeding a threshold, sending the current orientation data to the host device at a second data transfer frequency, wherein the second data transfer frequency is a higher data transfer frequency than the first data transfer frequency; and
adjusting content displayed on the display device based on the current orientation data received by the host device.

10. The method of claim 9, wherein the heartbeat of orientation data synchronizes the orientation of the data displayed on the display device with the output of the host device.

11. The method of claim 9, comprising suspending the transmission of the current orientation data to the host device at the second data transfer frequency in response to a determination that the threshold is not exceeded.

12. The method of claim 9, comprising suppressing the delivery of the orientation data to the host device until the threshold has been exceeded.

13. The method of claim 9, wherein the first data transfer frequency decreases a load on processing and cooling resources of the host device relative to the second data transfer frequency.

14. A computing device, comprising:
a display device;
a sensor; and
an interface to report data output by the sensor to a host computing device;
wherein the computing device is structured to:
send a heartbeat of data output by the sensor to a host device at a first data transfer frequency;
compare current data output by the sensor with earlier data received from the sensor; and
in response to a difference between the current data and the earlier data exceeding a threshold, increase the data transfer frequency of sending data output by the sensor to the host computing device;
wherein the sensor comprises an accelerometer and the data output by the sensor comprises orientation data of the computing device.

15. The computing device of claim 14, wherein the host computing device comprises a video conferencing system, and the computing device is a center of room control (CoRC) device for the video conferencing system that is communicatively coupled to the host computing device.

16. The computing device of claim 14, wherein the earlier data comprises multiple data points from the sensor immediately preceding the current data.

* * * * *